March 10, 1970  B. VIZUETE ET AL  3,499,469
SELF-SEALING PRESSURE PLUG
Filed June 21, 1967
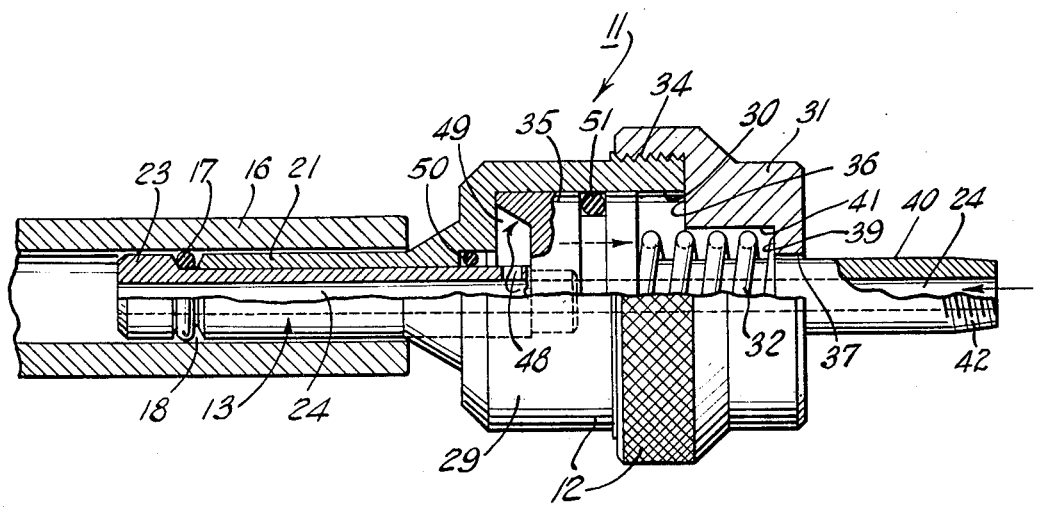
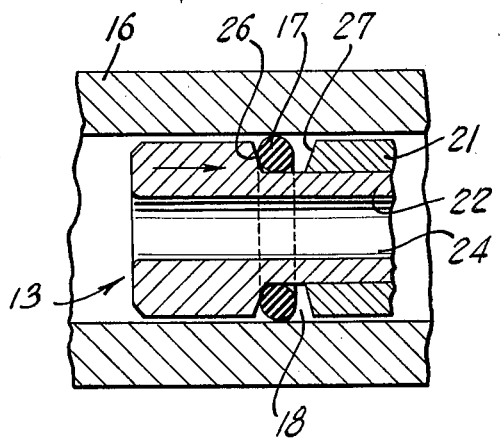
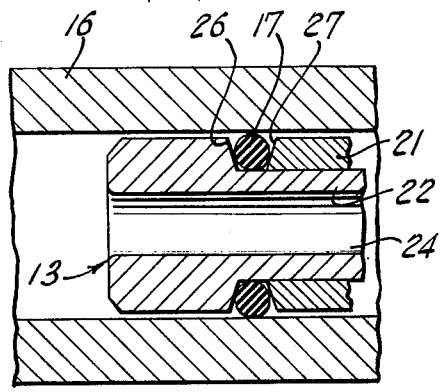

3,499,469
SELF SEALING PRESSURE PLUG
Bennie Vizuete and Richard J. North, Port Arthur, Tex.,
assignors to Texaco Inc., New York, N.Y., a corporation of Delaware
Filed June 21, 1967, Ser. No. 647,778
Int. Cl. F16l 55/12, 21/04; G01m 3/04
U.S. Cl. 138—90
5 Claims

ABSTRACT OF THE DISCLOSURE

A hydraulic test plug for pressure testing of tubes. There is a hollow mandrel for admitting the hydraulic test fluid to the interior of a tube under test. There is a passage connected to the hollow for permitting the test fluid directly to apply actuation force to expand a seal between the mandrel and the interior of the tube.

BACKGROUND OF THE INVENTION

Field of the invention

This invention relates to a tool that is applicable to pressure testing of hollow tubular elements. More specifically, it may be described as a self-sealing pressure plug for use in pressure testing of tubes.

Description of the prior art

While hydraulic pressure testing machines are known in the art and they may be employed to apply hydraulic pressure to the interior of pipes or the like, such machines involve relatively complex and expensive machinery. Consequently, they are not applicable to a testing of individual tubes in a tube bundle, such as are found in heat exchanges and the like. Furthermore, while a known machine of the prior art discloses a tool that is employed by inserting one of a pair of similar tools into each end of a pipe that is to be given hydraulic test pressure that tool is quite complicated in structure and involves not only gripping elements for holding the pipe against longitudinal movement (when pressure seal actuation is applied) but involves a separate and distinct hydraulic pressure system for actuating the seal. On the other hand, this invention provides a simple and effective tool that may be employed in pairs, or at the open end of tubing or the like. It merely involves insertion of the tool and thereafter application of hydraulic test pressure. Consequently, it is a highly practical and very beneficial tool for use in hydraulic testing of tubes in a tube bundle. Most especially is this so where there are a high number of tubes for testing and consequently the time element is of prime importance.

SUMMARY OF THE INVENTION

Briefly, this invention relates to a self-sealing pressure plug for use in pressure testing of tubes. It comprises in combination a hollow mandrel adapted to be inserted in one end of a tube to be tested and to permit flow of test fluid therethrough. It also comprises expansible seal means associated with said mandrel for creating a pressure tight seal with the walls of said tube, and means for expanding said seal means comprising a passage connected to said hollow for permitting said test fluid to actuate the seal means.

Again briefly, the invention may be described as a pressure actuated seal for the outside of a conduit that is adapted for admitting pressure-test fluid into an enclosure to be tested for leakage. It comprises a resilient seal that is carried by said conduit, and means for deforming said seal to tighten the sealing action. It also comprises means directly responsive to the pressure of said pressure-test fluid for actuating said deforming means.

BRIEF DESCRIPTION OF THE DRAWINGS

The foregoing and other objects and benefits of the invention will be more fully set forth below in connection with the best mode contemplated by the inventors of carrying out the invention, and in connection with which there are illustrations provided in the drawings, wherein:

FIG. 1 is an assembly in side elevation, partly in cross-section, and illustrating a tool according to the invention as it would be inserted in one end of a tube to be pressure tested;

FIG. 2 is an enlarged cross-section of a detail, illustrating the seal in its unexpanded position; and FIG. 3 is another enlarged cross-section similar to FIG. 2 but showing the seal with the parts ready to apply squeeze pressure to the seal.

DESCRIPTION OF THE PREFERRED EMBODIMENT

In maintenance operations involving heat exchangers and the like, it is often necessary to make pressure tests on the tubes of a bundle. This is done in order to determine whether there are any leaks which may exist or have developed and, if so, under what pressures such leaks exist.

A tube bundle of the foregoing type involves a large number of individual tubes which ordinarily have relatively small internal diameter. These are grouped together and fill a cylindrical space that may be encased for providing heat exchange between fluids on the interior of the tubes and a fluid surrounding the tubes inside the casing. These tubes are usually attached at each end into a so-called tube sheet and together they form the so-called bundle.

In the past, it has been a practice to pressure test the tubes of such a bundle by first plugging one end of a tube with a lead tapered plug that must be hammered into place to provide the required pressure tight seal. Thereafter, the other end of the tube will have a tube or pipe inserted, with a similar wedge or other seal to hold against internal pressure when the test is made. Then the test fluid is directed into the tube under test through the wedged insert pipe or tube. A standard procedure is to build up pressure while observing to determine whether there are any pressure leaks within a given maximum pressure range. It will be appreciated that any such leak would be observerable by a drop in pressure, or by a failure of the hydraulic pressure to continue increasing.

With a pair of tools according to this invention, a given tube of a tube bundle may be given a hydraulic pressure test (as generally indicated above) in a very rapid and expeditious manner. Thus, two of the tools according to this invention would be inserted in the ends of a given tube. Then, one tool would have the passage therethrough closed, while the other would be connected to a source of hydraulic fluid. After the test had been carried out, the pressure would be reduced and fluid drained as desired. That would be followed by removal of the tools from the ends of the tube. All of the foregoing operation could be very rapidly carried out, and the time saving over the prior procedures is tremendous.

Referring to FIG. 1, there is a tool 11 which has an enlarged body portion 12 with an integrally attached mandrel 13 at one end. Mandrel 13 is adapted for being inserted in a tube 16 that is to have the interior thereof supplied with hydraulic fluid for applying a pressure test thereto. The mandrel 13 carries a resilient material O ring 17 in an annular groove 18 on the mandrel 13 near the extremity thereof.

The groove 18 is formed between two relatively movable parts of the mandrel 13. There is a sleeve 21 that is integrally attached to, as part of the body 12 of the tool. Such sleeve 21 surrounds a reduced diameter inner member 22. Member 22 is hollow and extends out from the interior of the body 12 of tool 11. There is a central passage 24 that runs all the way through the tool 11. The member 22 has an enlarged tip portion 23 that has a maximum diameter which is substantially the same as the outside diameter of the sleeve 21.

With reference to FIG. 2, it will be noted that the groove 18 is formed between a pair of sloping annular side walls 26 and 27. The surface 26 is formed on the inside edge of the tip 23 of the hollow member 22, while the other annular sloping surface 27 is formed on the extremity of the sleeve 21 that is adjacent to the tip 23. The sleeve 21 surrounds the interior reduced diameter member 22 in a free sliding relationship.

The body 12 of the tube 11 is formed of two main parts. There is a cylinder 29 that has a cylindrical bore 30 on the interior thereof. Also there is a cap 31 that holds in place a compression spring 32 that in turn acts to bias a piston 35 toward the left end of the bore 30 (as viewed in FIG. 1).

It will be observed that the cap 31 is attached to the exterior of cylinder 29 by being screwed onto a threaded portion 34 of the cylinder 29, in a manner clearly illustrated. Cap 31 has an interior shoulder 36 which limits the movement of the piston 35 in the direction of compression of the spring 32 when the cap is in place. There is an opening 37 in the top of cap 31, through which a pipe 40 extends. This opening 37 is large enough to permit free relative motion between the pipe 40 and the cap 31. It will be observed also that the spring 32 surrounds the pipe 40 within the cap 31 and one end rests against an interior surface 39 formed at the end of a well 41 which has adequate inside diameter to freely receive the spring 32 therein. The other end of the spring 32 rests against one face of the piston 35. Consequently, the spring 32 provides a bias force tending to move the piston 35 away from the right hand end (as viewed in FIG. 1) of the body 12 of the tool 11.

The pipe 40 is hollow (having the passage 24 extending therethrough) and has a pipe thread 42 cut onto the extremity thereof in order to receive a valve (not shown) for use in connection with operating the tool.

It is pointed out that the pipe 40 is integrally attached to and moves with the piston 35, and that the passage 24 extends through the interior of the piston 35 and connects with the hollow interior of pipe 40. Of course the passage 24 also connects through the piston 35 with the hollow interior of the member 22. Thus, the passage 24 continues through the whole tool 11 and makes one complete free passageway for hydraulic fluid to flow through the tool from one end to the other.

It is important to observe that there is a radial passage 48 which connects the hollow interior passage 24 to a space 49 within the cylinder 30. The space 49 is located in the left hand face (as viewed in FIG. 1) of the piston 35. Furthermore, there are fluid seals 50 and 51 that provide a fluid tight chamber therebetween on the inside of the cylinder 29 of body 12.

It will be observed that the member 22 of the mandrel is fixedly attached to the piston 35, e.g., by being screwed into a socket therein so that the piston 35 moves as a unit with the member 22 and also with the pipe 40 on the other side thereof. On the other hand, it will be appreciated that such movement is relative to the body portion 12 and the sleeve 21 which is part of the mandrel 13.

OPERATION

The operation of a tool 11, as illustrated in the figures of the drawings, may be described briefly as follows. First, the other end of the tube 16 that is to have hydraulic fluid pressure applied for testing same, must be closed to withstand the pressures of the test. Preferably this may be done by inserting another tool like that shown in FIG. 1, in the other end of the tube 16. Such tool would have a valve (not shown) attached to it in order to close the interior passageway therethrough and withstand the pressure when it is applied. This other tool would automatically apply sufficient sealing action to withstand the high pressures of the test. Such sealing action would be accomplished in the same manner as with the tool at the test end which will be described below.

When a pressure is carried out, a tool 11 will be inserted in one end of a tube 16, preferably far enough to have the tapered portion of the mandrel 13 come in contact with the edge of the tube 16. Then the valve (not shown) on the free end of the tool (attached by being screwed onto the threads 42) will be opened to admit hydraulic fluid. Such fluid will fill the tube 16 that is to be tested. As the tube 16 becomes filled with fluid the same test fluid will also flow through the radial passage 48 and fill the space 49 on one side of the piston 35. Then as fluid pressure is built up following the filling of the tube and any connected spaces, this pressure will cause the mechanical advantage provided by the increased area of the face of piston 35 to create translatory or longitudinal movement between the piston 35 and the body 12 of the tool 11. This longitudinal movement will compress the spring 32 and at the same time will cause relative movement between the sleeve 21 and the inner member 22. The latter will cause the annular sloping surfaces 26 and 27 to approach one another and thus squeeze the O ring 17 therebetween. This then provides a tight pressure seal at the O ring 17 which is dependent directly upon the hydraulic pressures involved and consequently will be substantially leakproof.

It may be observed that as the piston 35 moves longitudinally within the cylindrical bore 30 against the pressure of spring 32, it carries the inner member 22 of the mandrel 13 along with the tip 23 thereof so that this movement effectively translates the annular sloping surface 26 toward the opposite sloping surface 27 on the outer edge of the sleeve 21. This movement is indicated by the arrow shown on the tip 23 in the FIG. 2 drawing. Since it is relative motion with respect to the other elements of the tool 11, the sleeve 21 might be considered as moving in the opposite direction. However, it will be observed that if the tool is placed (as illustrated in FIG. 1) with the shoulder of the mandrel 13 against the edge of the tube 16, the movement of the sleeve 21 and connected part 29 as well as the rest of the body 12, which might otherwise take place, does not. Rather, the movement is all taken up by the other elements which move relative thereto, as just described.

It will be appreciated that the pressure test itself may take any satisfactory form. For example, there may be a pressure gauge (not shown) which will be connected to the test fluid being applied to the tube 16 and which may be observed. Then as hydraulic pressure is increased to a predetermined amplitude, the pressure being applied inside of the tube under test may be observed and any leakage will be indicated in the form of a drop, or failure to increase in pressure.

While a particular embodiment of the invention has been described in considerable detail above in accordance with the applicable statutes, this is not to be taken as in any way limiting the invention but merely as being descriptive thereof.

We claim:
1. A self-sealing pressure plug for use in pressure testing of tubes, comprising in combination
   a hollow mandrel adapted to be inserted in one end of a tube to be tested and to permit direct flow of test fluid therethrough,
   said mandrel having an unobstructed passage therethrough for permitting said direct flow of test fluid,
   a resilient annular member carried by said mandrel for creating a pressure tight seal with the walls of said tube,
   means for expanding said seal means comprising a di- rect passage connected between said unobstructed passage and said expansible seal means for permitting said test fluid to actuate the seal means, an annular groove on said mandrel for supporting said annular member therein, side walls on said groove for contacting said annular member, and wherein said means for expanding further comprises hydraulically actuated means for moving one of said side walls relative to the other.

2. The invention according to claim 1 wherein said resilient annular member comprises an O ring.

3. A self sealing pressure plug according to claim 1 wherein said hollow mandrel comprises a maximum diameter tip having a sloping annular surface connecting with a reduced diameter portion that joints the body of the plug, said sloping surface comprising one of said side walls, a sleeve surrounding said reduced diameter portion and having a sloping surface at the extremity thereof, said last named sloping surface comprising the other of said side walls.

4. A self sealing pressure plug according to claim 3 wherein said hydraulically actuated means comprises a cylinder and piston connected respectively to said sleeve and to said tip, and wherein said direct passage connects to said cylinder.

5. A self sealing pressure plug according to claim 4 further including spring means for biasing said piston toward one end of said cylinder.

References Cited

UNITED STATES PATENTS

| | | | |
|---|---|---|---|
| 595,189 | 12/1897 | Mern | 138—90 |
| 1,647,121 | 11/1927 | Beall | 73—49.5 |
| 1,830,817 | 11/1931 | Voorhies et al. | 138—90 |
| 2,062,527 | 12/1936 | Postlewaite | 73—49.5 |
| 2,793,783 | 5/1957 | Hutton | 138—90 XR |
| 2,873,764 | 2/1959 | Lombard et al. | 73—49.5 XR |

FOREIGN PATENTS 8,736     1908     Great Britain.

ROBERT R. MACKEY, Primary Examiner

U.S. Cl. X.R.

73—49.1, 49.5